US010830208B2

(12) United States Patent
Tomas et al.

(10) Patent No.: US 10,830,208 B2
(45) Date of Patent: Nov. 10, 2020

(54) SYSTEM AND METHOD FOR MITIGATING BLADE RUN-AWAY LOADS IN THE EVENT OF A PITCH SYSTEM FAILURE

(71) Applicant: General Electric Company, Schenectady, NY (US)

(72) Inventors: Santiago Tomas, Barcelona (ES); Raveendra Penmatsa, Bangalore (IN); Soeren Georg, Berlin (DE); Ramy Michael Souri, Greer, SC (US); Ryan Michael Sunyak, Greenville, SC (US); Darren John Danielsen, Simpsonville, SC (US); Robert Peter Slack, Seattle, WA (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 16/133,019

(22) Filed: Sep. 17, 2018

(65) Prior Publication Data
US 2019/0113021 A1  Apr. 18, 2019

(30) Foreign Application Priority Data
Oct. 13, 2017  (EP) ..................................... 17382682

(51) Int. Cl.
*F03D 7/02* (2006.01)
*F03D 7/04* (2006.01)
*F03D 17/00* (2016.01)

(52) U.S. Cl.
CPC ........... *F03D 7/0224* (2013.01); *F03D 7/043* (2013.01); *F03D 17/00* (2016.05);
(Continued)

(58) Field of Classification Search
CPC ........ F03D 7/0224; F03D 7/043; F03D 17/00; F05B 2260/70; F05B 2260/80;
(Continued)

(56) References Cited

U.S. PATENT DOCUMENTS 9,157,415 B1 * 10/2015 Seymour ................... F03D 7/00
9,976,539 B2 * 5/2018 Daher Adegas ........ F03D 7/043
(Continued)

OTHER PUBLICATIONS

Extended European Search Report and Opinion issued in connection with corresponding EP Application No. 17382682.7 dated Apr. 12, 2018.

*Primary Examiner* — Brian P Wolcott
(74) *Attorney, Agent, or Firm* — Dority & Manning, P.A.

(57) ABSTRACT

A method for identifying a blade run-away condition in the event of a pitch system failure of a rotor blade of a wind turbine includes determining, via one or more sensors, an actual rotor loading of the wind turbine. The method also includes determining, via a turbine controller, an estimated rotor loading of the wind turbine based on at least one of one or more operating conditions of the wind turbine or one or more wind conditions of the wind turbine. Further, the method includes determining a difference between the actual rotor loading and the estimated rotor loading. The method also includes determining whether the blade run-away condition is present based on the difference. The method may also include implementing a corrective action that mitigates loads caused by the blade run-away condition.

12 Claims, 7 Drawing Sheets

(52) U.S. Cl.
CPC ....... *F05B 2260/70* (2013.01); *F05B 2260/80* (2013.01); *F05B 2270/107* (2013.01); *F05B 2270/327* (2013.01); *F05B 2270/328* (2013.01); *F05B 2270/807* (2013.01); *F05B 2270/8042* (2013.01)

(58) Field of Classification Search
CPC .......... F05B 2270/107; F05B 2270/327; F05B 2270/328; F05B 2270/8042; F05B 2270/807
See application file for complete search history.

(56) References Cited

U.S. PATENT DOCUMENTS

| | | |
|---|---|---|
| 2010/0123314 A1 | 5/2010 | Menke |
| 2015/0267684 A1 | 9/2015 | Seymour et al. |
| 2015/0337802 A1* | 11/2015 | Su .................. F03D 7/0224 416/1 |
| 2015/0361964 A1 | 12/2015 | Daher Adegas et al. |
| 2018/0335018 A1* | 11/2018 | Cao .................. G05B 23/0286 |

* cited by examiner

SYSTEM AND METHOD FOR MITIGATING BLADE RUN-AWAY LOADS IN THE EVENT OF A PITCH SYSTEM FAILURE

FIELD

The present disclosure relates generally to wind turbines, and more particularly to systems and methods for mitigating blade run-away loads in the event of a pitch system failure of a rotor blade of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, the individual rotor blades may rotate about a pitch axis thereof via a pitch system having a pitch controller.

During normal operation, the pitch controller receives the pitch commands from the turbine controller. With this information, the pitch controller sends a pitch rate command (e.g. a speed reference) to a pitch motor and receives feedback from a pitch system encoder, such as a pitch motor encoder. The pitch system encoder then sends position feedback to the pitch controller and the pitch controller calculates the pitch rate from the feedback considering the sampling time.

If the pitch system encoder fails, however, the controller interprets the feedback signals as "blade not moving" and increases the speed reference in an attempt to reach the pitch position command from the controller. This increase speeds up the pitch motor and pitch rate, thereby producing a blade run-away condition towards power or feather, depending on the sign of the last speed reference. Additionally, feedback from the pitch controller to the turbine controller becomes frozen, which is similar to the blade stuck condition, even if the rotor blade actually moves.

As such, when the pitch system encoder is faulted, the pitch controller cannot determine whether the rotor blade is moving or not as the controller does not receive pitch movement feedback. In the blade stuck condition, the turbine controller may receive an encoder failure signal since current may be going to the pitch motor in an attempt to move the blade, even if not capable of it.

In order to effectively reduce loads caused by the blade run-away condition, the turbine controller needs to be able to differentiate between the blade stuck scenario and the blade run-away scenario.

Accordingly, improved systems and methods for identifying the blade run-away condition in the event of a pitch system failure so as to reduce loads caused thereby would be desired.

BRIEF DESCRIPTION

Aspects and advantages of the invention will be set forth in part in the following description, or may be obvious from the description, or may be learned through practice of the invention.

In one aspect, the present disclosure is directed to a method for identifying a blade run-away condition in the event of a pitch system failure of a pitch system of a rotor blade of a wind turbine. The method includes determining, via one or more sensors, an actual rotor loading of the wind turbine. The method also includes determining, via a turbine controller, an estimated rotor loading of the wind turbine based on at least one of one or more operating conditions of the wind turbine or one or more wind conditions of the wind turbine. Further, the method includes determining a difference between the actual rotor loading and the estimated rotor loading. As such, the method includes determining whether the blade run-away condition is present based on the difference.

In one embodiment, the step of determining whether the blade run-away condition is present based on the difference may include determining whether the difference is greater than a predetermined threshold. In another embodiment, the step of determining whether the blade run-away condition is present based on the difference may include determining whether the estimated rotor loading is less than the actual rotor loading by a predetermined amount.

In further embodiments, the method may include receiving, by the turbine controller, a signal from a pitch controller of the pitch system indicative of the pitch system failure.

In additional embodiments, the operating condition(s) may include one or more pitch angles of the rotor blades, rotor speed, generator speed, torque output, power output, or any other suitable turbine operating parameter. Further, the wind condition(s) may include wind speed, wind direction, turbulence, wind gust, wind shear, or any other wind parameter.

Thus, in one embodiment, the step of determining the estimated rotor loading of the wind turbine based on at least one of one or more operating conditions of the wind turbine or one or more wind conditions of the wind turbine may include calculating the estimated rotor loading of the wind turbine as a function of the wind speed, the rotor speed, and the one or more pitch angles.

In particular embodiments, the actual rotor loading and the estimated rotor loading may correspond to any rotor, rotor blade, and/or hub loading of the wind turbine. For example, in one embodiment, the actual rotor loading and the estimated rotor loading may correspond to hub flange bending moment, a blade bending moment, or any other loading condition of the rotor In several embodiments, the method may include determining whether the blade run-away condition is positioned towards feather or power. In such embodiments, the method may include generating a vector of measured actual hub flange bending moments and determining whether the blade run-away condition is positioned towards feather or power based on the vector.

In certain embodiments, the method may further include implementing a corrective action based on the difference.

In another aspect, the present disclosure is directed to a system for identifying a blade run-away condition of a rotor blade of a wind turbine. The system includes a pitch system for rotating the rotor blade, at least one sensor configured for monitoring an actual rotor loading of the wind turbine, and a turbine controller communicatively coupled to the at least one sensor and the pitch controller. Further, the pitch system includes a pitch controller. The controller includes at least one processor configured to perform one or more operations, including but not limited to receiving a signal from the pitch controller indicative of a pitch system failure, in response to receiving the signal, determining an estimated rotor loading of the wind turbine based on at least one of one or more operating conditions of the wind turbine or one or more wind conditions of the wind turbine, determining a difference between the actual rotor loading and the estimated rotor loading, determining whether the blade run-away condition is present based on the difference.

In one embodiment, the sensor(s) may include proximity sensor, an inductive sensor, a Miniature Inertial Measurement Unit (MIMU), a pressure sensor, an accelerometer, a Sonic Detection and Ranging (SODAR) sensor, a Light Detection and Ranging (LIDAR) sensor, an optical sensor, or similar. It should also be understood that the system may further include any of the additional features as described herein.

In yet another aspect, the present disclosure is directed to a method for mitigating loads in the event of a pitch system failure of a rotor blade of a wind turbine. The method includes receiving, via a turbine controller, a signal from a pitch controller indicative of the pitch system failure. Further, the method includes determining, via one or more sensors, an actual rotor loading of the wind turbine. The method also includes determining, via the turbine controller, an estimated rotor loading of the wind turbine based on at least one of one or more operating conditions of the wind turbine or one or more wind conditions of the wind turbine. Another step includes determining, via the turbine controller, a difference between the actual rotor loading and the estimated rotor loading. The method further includes determining, via the turbine controller, whether a defective blade condition is present in the rotor blade based on the difference. If the defective blade condition is present, the method also includes implementing a corrective action based on a type of the defective blade condition.

In certain embodiments, the type of the defective blade condition may include a blade run-away condition or a blade stuck condition. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
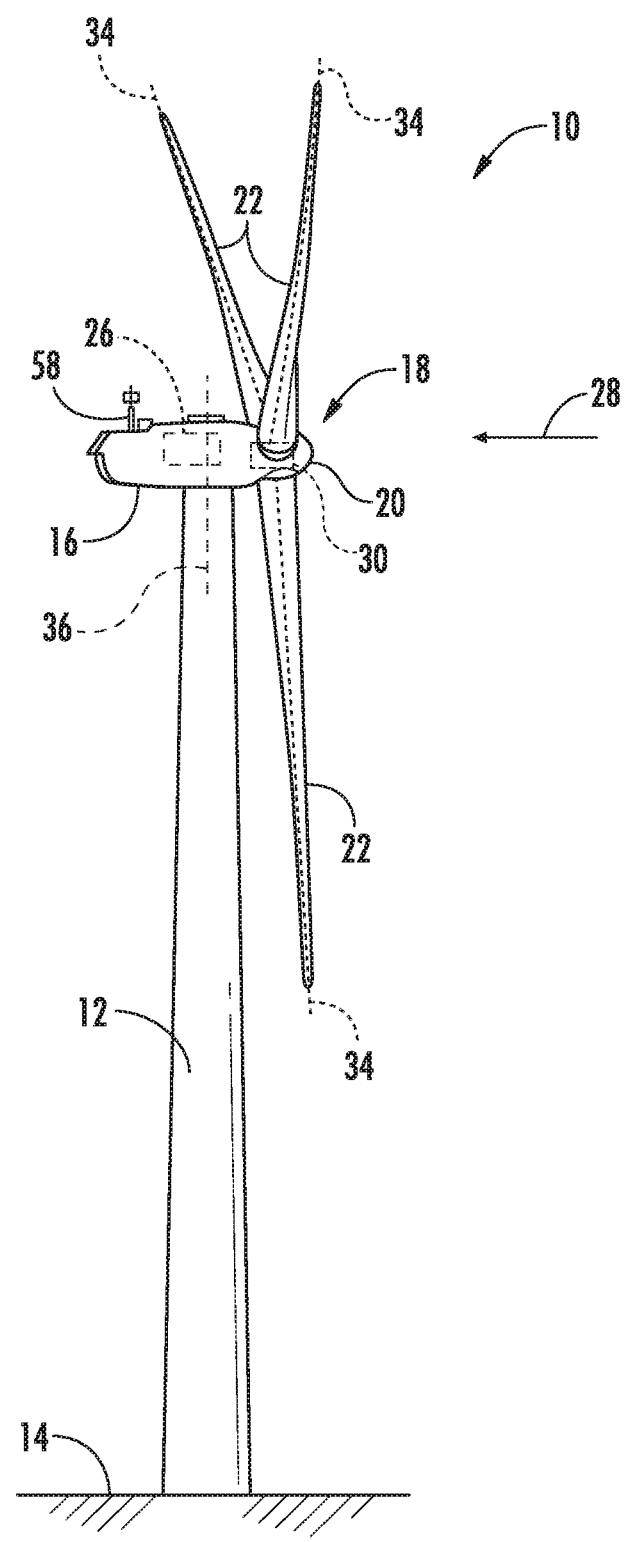
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
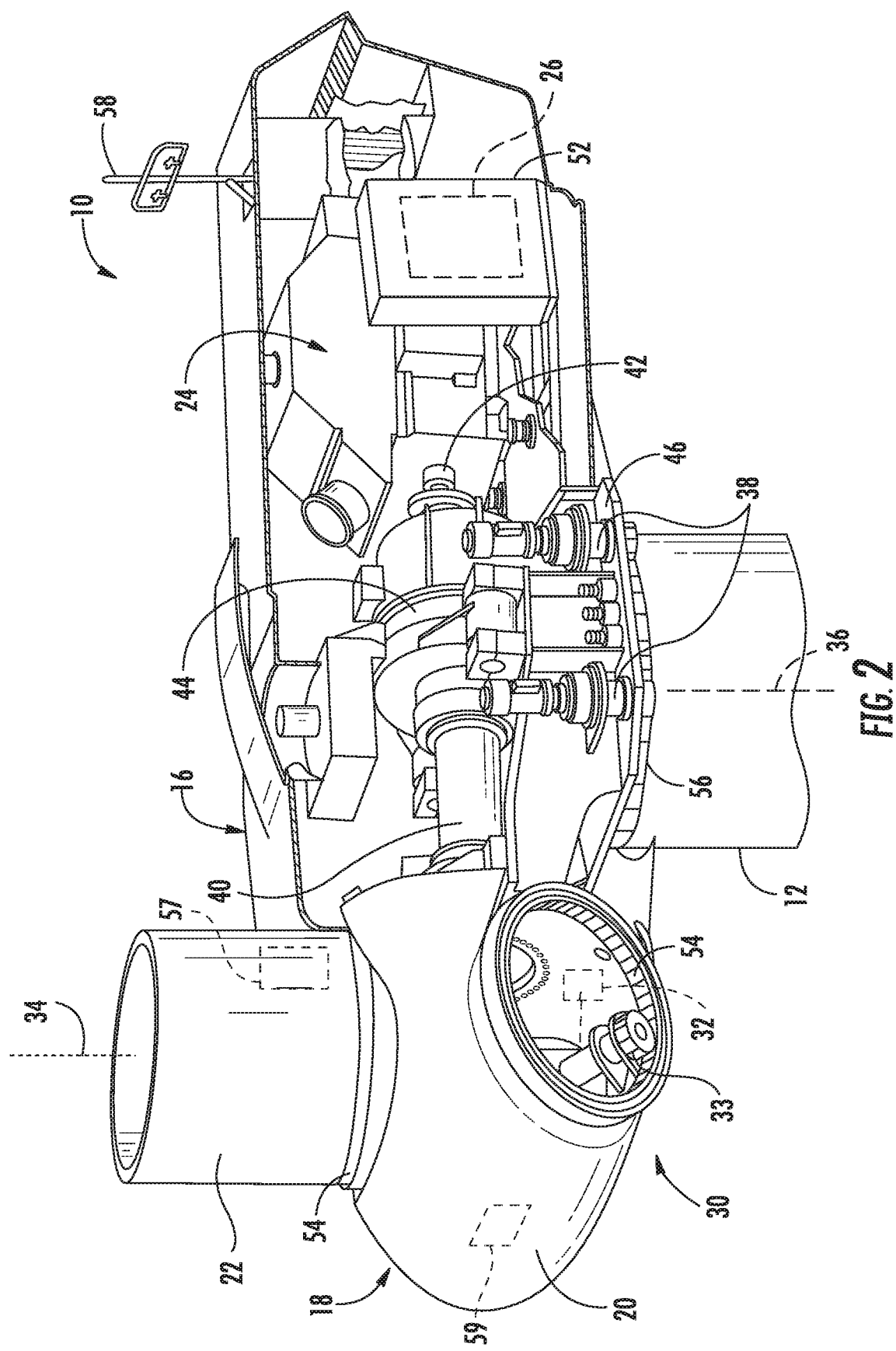
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40. It should be appreciated that the main shaft 40 may generally be supported within the nacelle 16 by a support frame or bedplate 46 positioned atop the wind turbine tower 12.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

In addition, as shown in FIG. 2, one or more sensors 57, 58, 59 may be provided on the wind turbine 10. More specifically, as shown, a blade sensor 57 may be configured with one or more of the rotor blades 22 to monitor the rotor blades 22, e.g. for loads, which is described in more detail herein. Further, as shown, a hub sensor 59 may be configured with the hub 20 to monitor the hub 20, e.g. for loads, which is described in more detail herein. It should also be appreciated that, as used herein, the term "monitor" and variations thereof indicates that the various sensors of the wind turbine 10 may be configured to provide a direct measurement of the parameters being monitored or an indirect measurement of such parameters. Thus, the sensors described herein may, for example, be used to generate signals relating to the parameter being monitored, which can then be utilized by the controller 26 to determine the condition.

In one embodiment, the sensor(s) 57, 58 may include proximity sensor, an inductive sensor, a Miniature Inertial Measurement Unit (MIMU), a pressure sensor, an accelerometer, a Sonic Detection and Ranging (SODAR) sensor, a Light Detection and Ranging (LIDAR) sensor, an optical sensor, or similar. It should also be understood that the system may further include any of the additional features as described herein.

Further, as shown, a wind sensor 58 may be provided on the wind turbine 10. The wind sensor 58, which may for example be a wind vane, and anemometer, and LIDAR sensor, or another suitable sensor, may measure wind speed and direction. As such, the sensors 57, 58, 59 may further be in communication with the controller 26, and may provide related information to the controller 26.

Further, the turbine controller 26 may also be communicatively coupled to various components of the wind turbine 10 for generally controlling the wind turbine 10 and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the direction 28 of the wind changes, the turbine controller 26 may be configured to control a yaw angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Similarly, the turbine controller 26 may also be communicatively coupled to a pitch system 30 having a plurality of pitch adjustment mechanisms 33 (one of which is shown) through the pitch controller 32 for controlling and/or altering the pitch angle of the rotor blades 22 (i.e., an angle that determines a perspective of the rotor blades 22 with respect to the direction 28 of the wind). For instance, the turbine controller 26 and/or the pitch controller 32 may be configured to transmit a control signal/command to each pitch adjustment mechanism 33 such that one or more actuators (not shown) of the pitch adjustment mechanism 33 may be utilized to adjust the pitch angle of the rotor blades 22 by rotating the blades 22 along their pitch axes 34 via a pitch bearing 54. The turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 33 (FIG. 2) of the wind turbine, or by directly controlling the operation of the plurality of pitch drives or pitch adjustment mechanisms.

Figure 3:
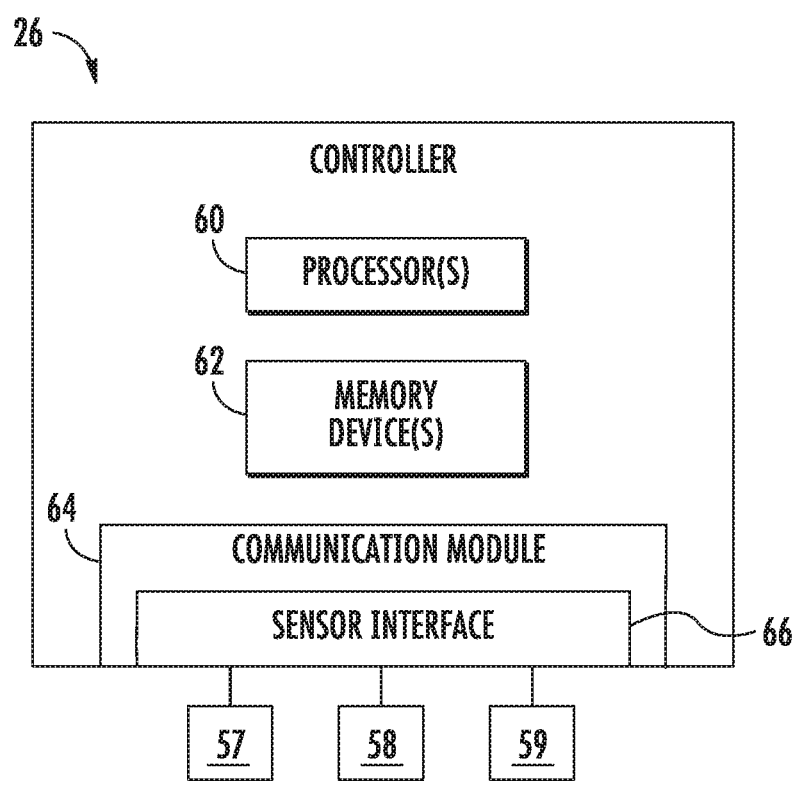
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58, 59 to be converted into signals that can be understood and processed by the processors 60. It should be appreciated that the sensors 57, 58, 59 may be communicatively coupled to the communications module 64 using any suitable means. For example, as shown in FIG. 3, the sensors 57, 58, 59 are coupled to the sensor interface 66 via a wired connection. However, in other embodiments, the sensors 57, 58, 59 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

As discussed above, the wind turbine 10, such as the nacelle 16 thereof, may rotate about the yaw axis 36 as required. In particular, rotation about the yaw axis 36 may occur due to changes in the wind direction 28, such that the rotor 18 is aligned with the wind direction 28. In addition, the pitch controller(s) 32 is configured to communicate with the turbine controller 26 regarding the wind direction 28, blade loading, etc. As such, the pitch controller(s) 32 control the pitch drive mechanism(s) 33 so as to rotate the rotor blades 22 about the pitch axes 34. When the pitch controller 32 is faulted, however, the turbine controller 26 cannot determine whether the rotor blades 22 are moving or not as the pitch controller 32 is incapable of sending pitch movement feedback. Thus, in such situations, the turbine controller 26 is configured to implement a control strategy to reduce loads on the faulted rotor blade and/or to prevent rotor imbalance.

Figure 4:
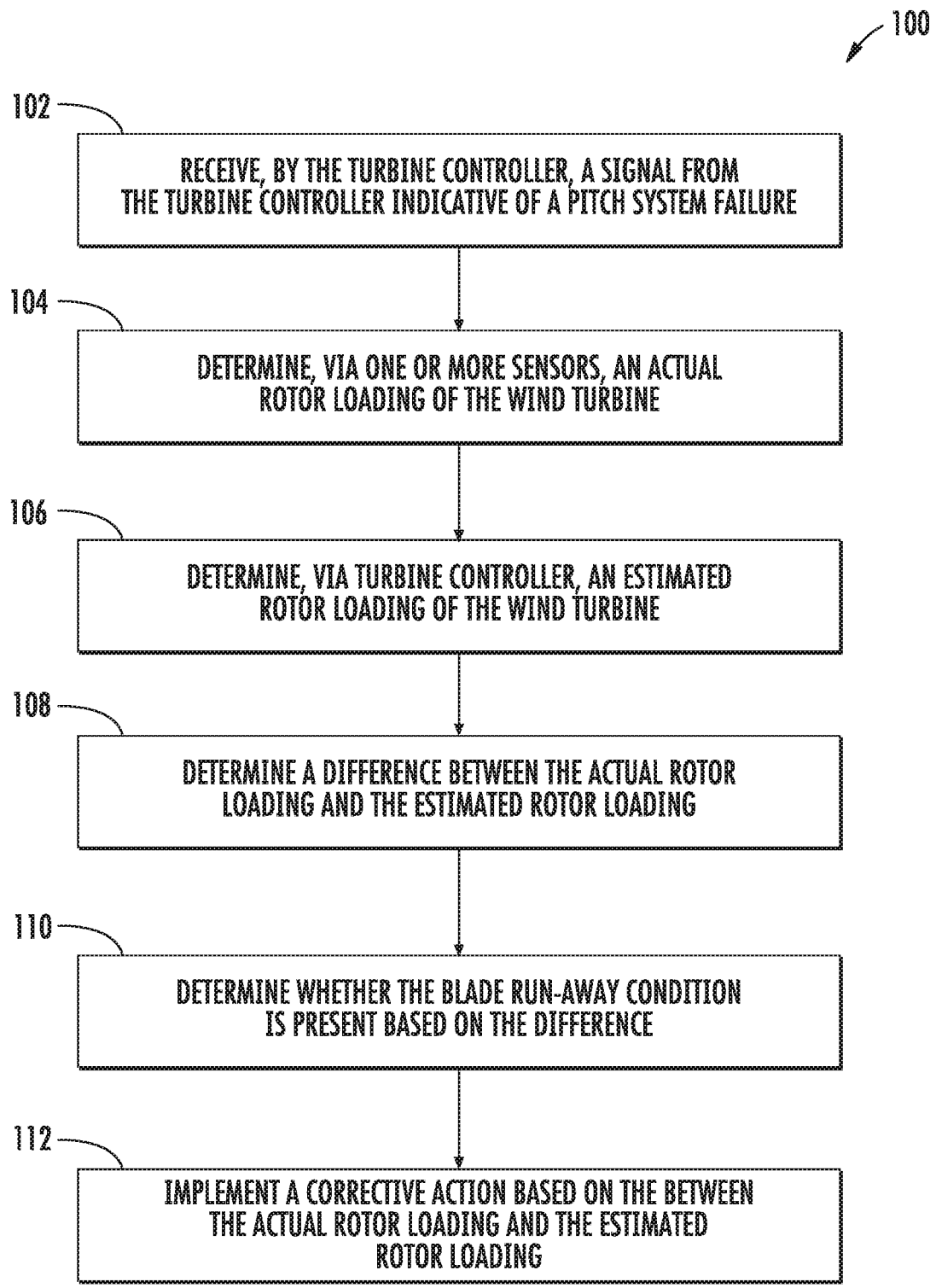
FIG. 4 illustrates a flow diagram of one embodiment of a method for identifying a blade run-away condition in the event of a pitch system failure of a rotor blade of a wind turbine and reducing loads based on same according to the present disclosure.
Figure 5:
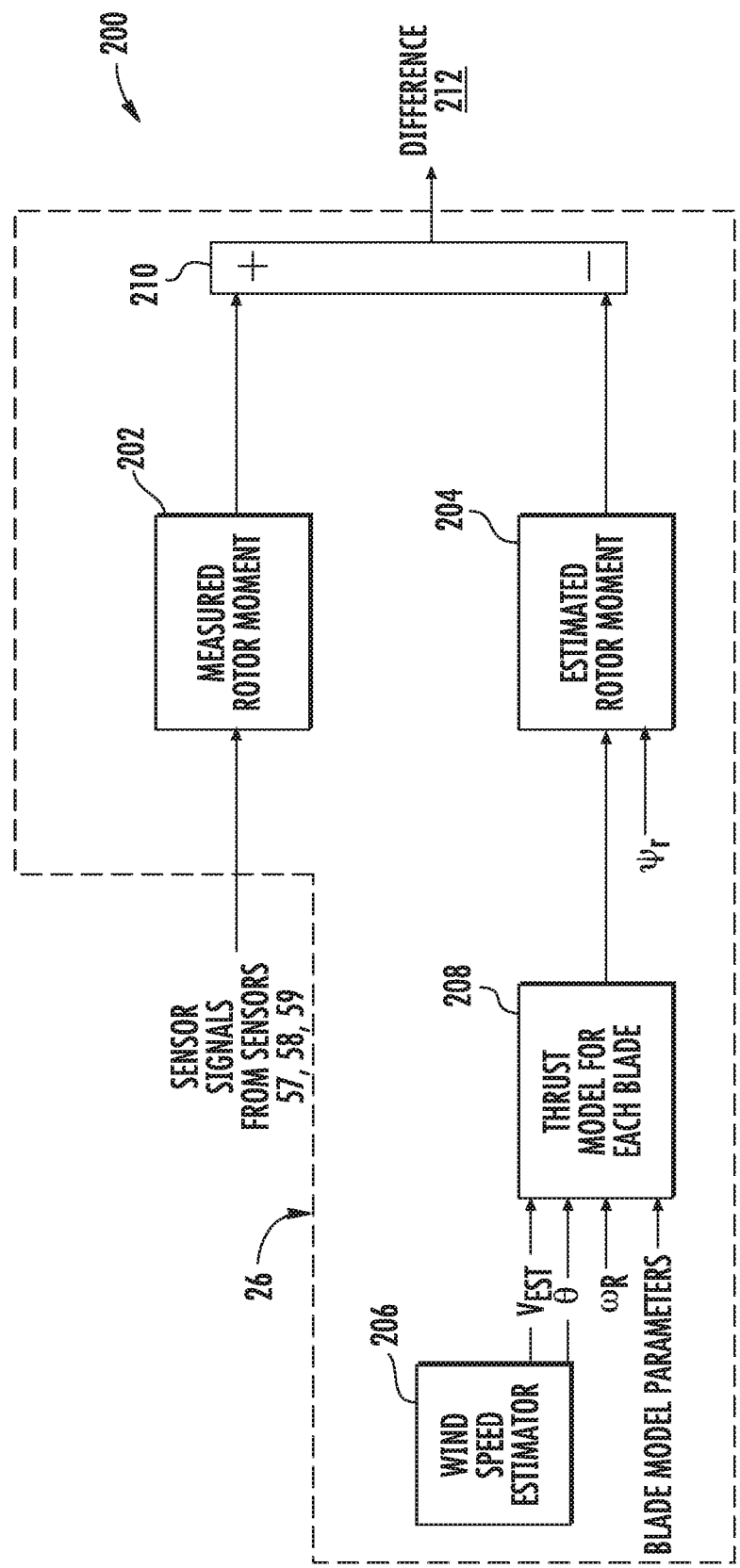
FIG. 5 illustrates a schematic diagram of one embodiment of a system for identifying a blade run-away condition in the event of a pitch system failure of a rotor blade of a wind turbine and reducing loads based on same according to the present disclosure.

Referring now to FIGS. 4 and 5, a method 100 and system 200 for identifying a blade run-away condition in the event of a pitch system failure such that loads associated with the failure can be mitigated are illustrated, respectively. More specifically, as shown in FIG. 4, a flow diagram of one embodiment of the method 100 for identifying a blade run-away condition in the event of a pitch system failure is illustrated. As shown at 102, the method 100 includes receiving, by the turbine controller 26, a signal from the pitch controller 32 indicative of the pitch system failure. As shown at 104, the method 100 includes determining, via one or more sensors 57, 58, 59, an actual rotor loading of the wind turbine 22, such as an actual hub flange bending moment or an actual blade root moment. For example, as shown in FIG. 5, the turbine controller 26 may receive sensor signals from the wind turbine sensors 57, 58, 59 so as to determine a measured rotor moment 202.

Referring now to FIGS. 4 and 5, a method 100 and system 200 for identifying a blade run-away condition in the event of a pitch system failure such that loads associated with the failure can be mitigated are illustrated, respectively. More specifically, as shown in FIG. 4, a flow diagram of one embodiment of the method 100 for identifying a blade run-away condition in the event of a pitch system failure is illustrated. As shown at 102, the method 100 includes receiving, by the turbine controller 26, a signal from the pitch controller 32 indicative of the pitch system failure. As shown at 104, the method 100 includes determining, via one or more sensors 57, 58, 59, an actual rotor loading of the wind turbine 10, such as an actual hub flange bending moment or an actual blade root moment. For example, as shown in FIG. 5, the turbine controller 26 may receive sensor signals from the wind turbine sensors 57, 58, 59 so as to determine a measured rotor moment 202.

Referring back to FIG. 4, as shown at 106, the method 100 further includes determining, via the turbine controller 26, an estimated rotor loading of the wind turbine 10, e.g. an estimated actual hub flange bending moment, based on one or more operating conditions and/or wind conditions of the wind turbine 10. In certain embodiments, the operating condition(s) may include pitch angles of the rotor blades 22, rotor speed, generator speed, torque output, power output, or any other suitable turbine operating parameter. Further, the wind condition(s) may include wind speed, wind direction, turbulence, wind gust, wind shear, or any other wind parameter. Moreover, certain operating and/or wind conditions may be estimated rather than directly monitored.

Referring back to FIG. 4, as shown at 108, the method 100 includes determining a difference between the actual rotor loading or moment and the estimated rotor loading or moment. For example, as shown in FIG. 5, the turbine controller 26 compares the measured rotor blade moment 202 and the estimated rotor moment 204 at 210 to determine the difference 212 therebetween. Thus, the turbine controller 26 can determine whether a defective blade condition is present in the rotor blade 22 based on the difference 212. As used herein, the defective blade condition may encompass various types of conditions, including but not limited to a blade run-away condition or a blade stuck condition.

Figure 6:
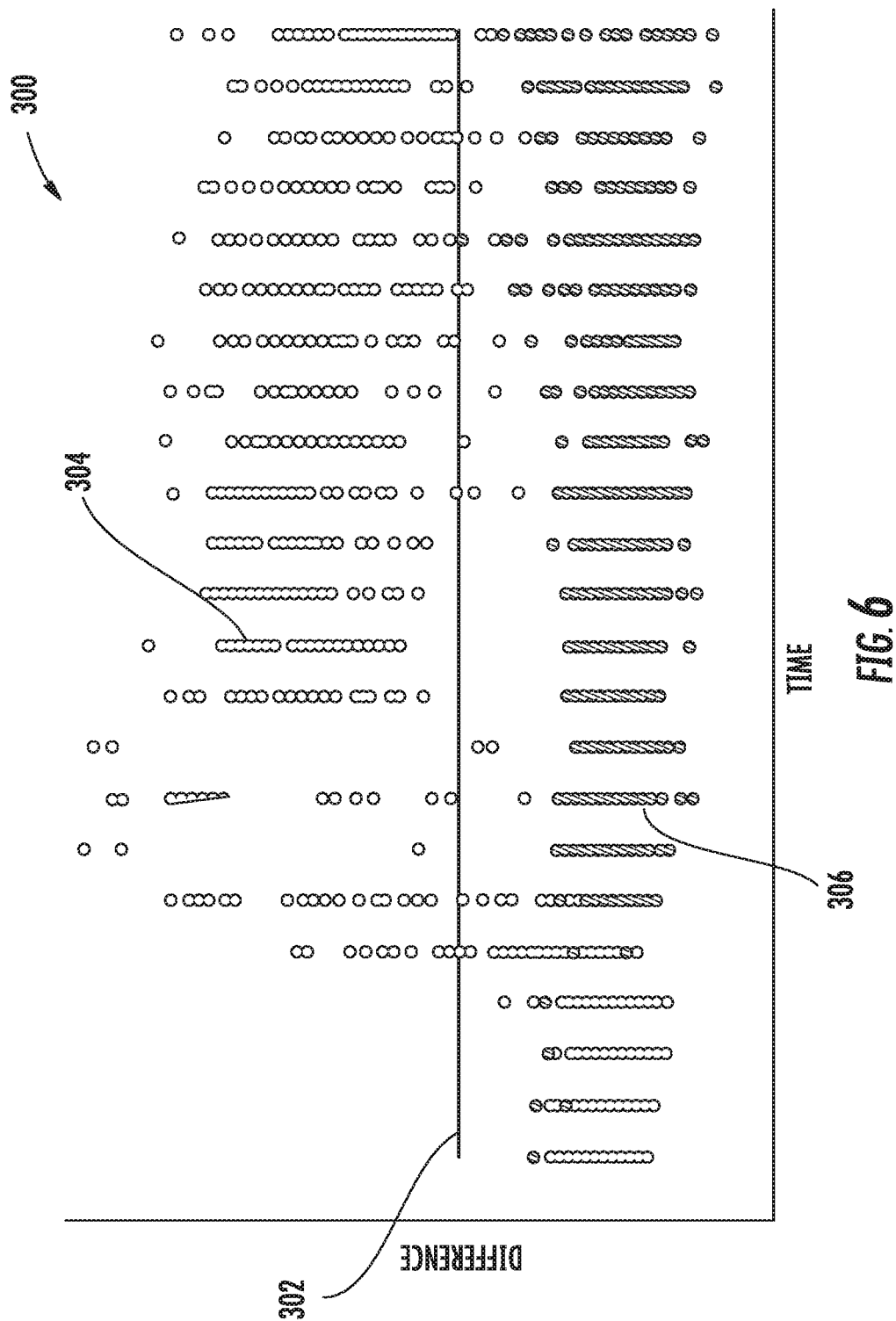
FIG. 6 illustrates a graph of one embodiment of the maximum value of the difference between the actual hub flange bending moment and the estimated hub flange bending moment for each one of the time series simulated (y-axis) and the average wind speed of those time series (x-axis) according to the present disclosure.

Thus, as shown at 110 of FIG. 4, the illustrated method 100 includes determining whether the blade run-away condition is present based on the difference 212. More specifically, in one embodiment, if the pitch position feedback is wrong due to a pitch system failure or loss (e.g. such as a pitch motor encoder failure), the difference will be higher than in any other scenario. As such, the turbine controller 26 may determine whether the difference 212 is greater than a predetermined threshold. More specifically, as shown in FIG. 6, a graph of one embodiment of the maximum value of the difference between the actual hub flange bending moment and the estimated hub flange bending moment for each one of the time series simulated (y-axis) and the average wind speed of those time series (x-axis) according to the present disclosure is illustrated. As shown, the difference 304 between the measured hub flange bending moment and the estimated hub flange bending moment for the blade run-away condition is above a threshold 302, whereas the difference 306 between the measured hub flange bending moment and the estimated hub flange bending moment for the blade stuck condition is lower than the threshold 302. In another embodiment, the turbine controller 26 may determine whether the estimated rotor loading is less than the actual rotor loading by a predetermined amount.

Referring back to FIG. 4, if the defective blade condition is present, as shown at 112, the method 100 may further include implementing a corrective action based on the between the actual rotor loading and the estimated rotor loading. For example, in certain embodiments, the corrective action may include shutting down the wind turbine 10, braking the wind turbine 10, de-rating the wind turbine 10, or up-rating the wind turbine 10. In further embodiments, de-rating or up-rating the wind turbine 10 may include altering a pitch angle of one or more of the rotor blades 22, modifying a generator torque, modifying a generator speed, modifying a power output, yawing the nacelle 16 of the wind turbine 10, braking one or more wind turbine components, activating an airflow modifying element on one of the rotor blades 22, or any combination thereof.

Once the blade run-away condition has been confirmed, the method 100 may also include determining whether the blade run-away condition is positioned towards feather (i.e. pitch movement towards idling pitch) or power (i.e. pitch movement towards minimum/fine pitch). In such embodiments, the method 100 may include generating a vector of measured actual hub flange bending moments of the rotor blade 22 and determining whether the blade run-away condition is positioned towards feather or power based on the vector. Thus, the measured hub flange bending moment can be used, as a vector, to differentiate between blade run-away towards power (i.e. the hub 20 bending towards the tower 12 in the position of a faulted blade) or towards feather (i.e. the hub 20 bending towards the tower 12 in the position of faulted blade+180 degrees).

Figure 7:
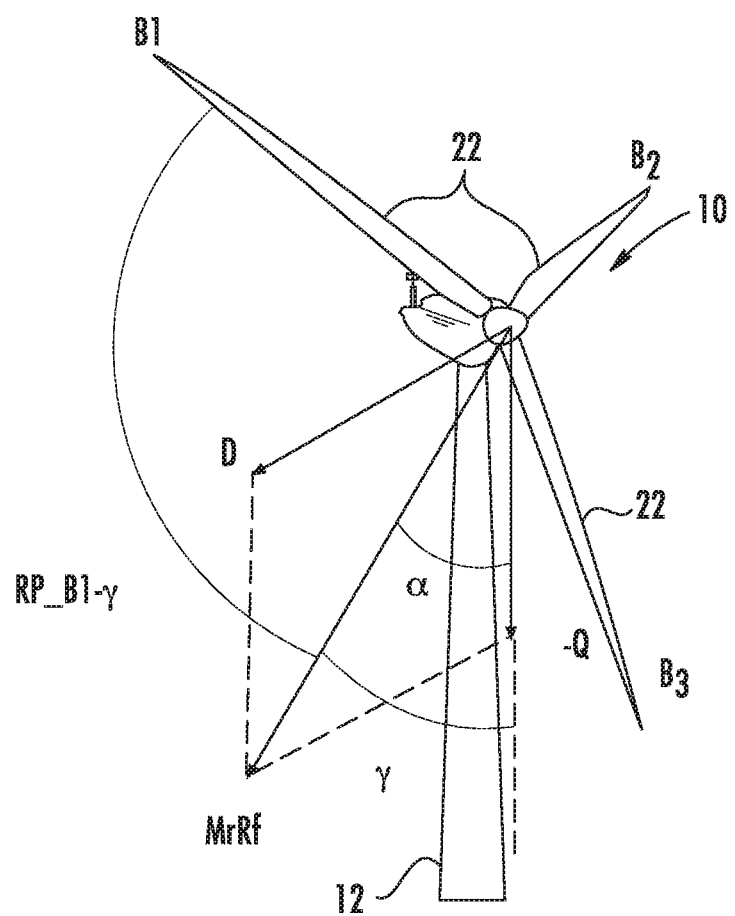
FIG. 7 illustrates a perspective view of one embodiment of a wind turbine according to the present disclosure, particularly illustrating various variables utilized to calculate a vector for determining blade run-away condition type.

For example, FIG. 7 illustrates a faulted rotor blade according to the present disclosure. As shown, one of the sensors 57, 58, 59 described herein measures a nodding moment D of the wind turbine 10, considering both aerodynamic and gravity loads. Further, as shown, one of the sensors 57, 58, 59 described herein measures a yawing moment Q of the wind turbine 10. Considering the gravity offset, the turbine controller 26 then calculates the measured hub flange bending moment MrRf as a vector, where γ is the vector angle with the rotor blade in the six o'clock position and a is the angle between the yawing moment (−Q) and the MrRf vector. In general, if the rotor position of the faulted blade minus γ equals 90 degrees, then the faulted blade in the run-away condition is moving towards power. Further, if the rotor position of the faulted blade minus γ equals negative 90 degrees, then the faulted blade in the run-away condition is moving towards feather. As such, by knowing the rotor position RP of B1 (which in this case is about 120 degrees), if γ is close to 30 degrees, then B1 is faulted with run-away towards power. In contrast, if γ is close to 210 degrees, then B1 is faulted with run-away towards feather.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

320049-1/GECW-323 COMPONENT LIST

| Reference Character | Component |
|---|---|
| 10 | Wind Turbine |
| 12 | Tower |
| 14 | Surface |
| 16 | Nacelle |
| 18 | Rotor |
| 20 | Rotatable Hub |
| 22 | Rotor Blade |
| 24 | Generator |
| 26 | Turbine Controller |
| 28 | Wind Direction |
| 30 | Pitch System |
| 32 | Pitch Controller |
| 33 | Pitch Adjustment Mechanisms |
| 34 | Pitch Axes |
| 36 | Yaw Axis |
| 38 | Yaw Drive Mechanism |
| 40 | Main Shaft |
| 42 | Generator Shaft |
| 44 | Gearbox |
| 46 | Bedplate |
| 52 | Control Cabinet |
| 54 | Pitch Bearing |
| 56 | Yaw Bearing |
| 57 | Sensor |
| 58 | Sensor |
| 59 | Sensor |
| 60 | Processor(s) |
| 62 | Memory Device(s) |
| 64 | Communications Module |
| 66 | Sensor Interface |
| 100 | Method |
| 102 | Method Step |
| 104 | Method Step |
| 106 | Method Step |
| 108 | Method Step |
| 110 | Method Step |
| 112 | Method Step |
| 200 | System |
| 202 | Measured Rotor Blade Moment |
| 204 | Estimated Rotor Blade Moment |
| 206 | Wind Speed Estimator |
| 208 | Thrust Coefficient Per Blade |
| 210 | Block |
| 212 | Difference |
| 300 | Graph |
| 302 | Predetermined Threshold |
| 304 | Blade Run-Away Condition |
| 306 | Blade Stuck Condition |

What is claimed is:

1. A method for identifying a blade run-away condition in the event of a pitch system failure of a rotor blade of a wind turbine, the method comprising:

determining, via one or more sensors, an actual rotor loading of the wind turbine;

determining, via a computer-implemented model programmed in a turbine controller, an estimated rotor loading of the wind turbine based, at least in part, on an estimated wind speed, rotor speed, rotor position, one or more pitch angles, and one or more blade model parameters of the wind turbine, the one or more blade model parameters comprising dimensional or non-dimensional parameters that describe at least one of power, thrust, torque, or bending moment under given conditions;

determining a difference between the actual rotor loading and the estimated rotor loading; and, determining whether the blade run-away condition is present based on the difference.

2. The method of claim 1, wherein determining whether the blade run-away condition is present based on the difference further comprises determining whether the difference is greater than a predetermined threshold.

3. The method of claim 1, wherein determining whether the blade run-away condition is present based on the difference further comprises determining whether the estimated rotor loading is less than the actual rotor loading by a predetermined amount.

4. The method of claim 1, further comprising receiving, by the turbine controller, a signal from a pitch controller of the pitch system indicative of the pitch system failure.

5. The method of claim 1, wherein the actual rotor loading and the estimated rotor loading comprises at least one of a hub flange bending moment or a blade bending moment.

6. The method of claim 1, further comprising implementing a corrective action based on the difference.

7. A system for identifying a blade run-away condition of a rotor blade of a wind turbine, the system comprising:

a pitch system for rotating the rotor blade, the pitch system comprising a pitch controller;

at least one sensor configured for monitoring an actual rotor loading of the wind turbine; and, a turbine controller communicatively coupled to the at least one sensor and the pitch controller, the controller comprising at least one processor configured to perform one or more operations, the one or more operations comprising:

receiving a signal from the pitch controller indicative of a pitch system failure;

in response to receiving the signal, determining, via a computer-implemented model programmed in the turbine controller, an estimated rotor loading of the wind turbine based, at least in part, on an estimated wind speed, rotor speed, rotor position, one or more pitch angles, and one or more blade model parameters of the wind turbine, the one or more blade model parameters comprising dimensional or non-dimensional parameters that describe at least one of power, thrust, torque, or bending moment under given conditions;

determining a difference between the actual rotor loading and the estimated rotor loading; and, determining whether the blade run-away condition is present based on the difference.

8. The system of claim 7, wherein the at least one sensor comprises at least one of a proximity sensor, an inductive sensor, a Miniature Inertial Measurement Unit (MIMU), a pressure sensor, an accelerometer, a Sonic Detection and Ranging (SODAR) sensor, a Light Detection and Ranging (LIDAR) sensor, or an optical sensor.

9. A method for mitigating loads in the event of a pitch system failure of a rotor blade of a wind turbine, the method comprising:

receiving, via a turbine controller, a signal from a pitch controller indicative of the pitch system failure;

determining, via one or more sensors, an actual rotor loading of the wind turbine;

determining, via the turbine controller, an estimated rotor loading of the wind turbine based on at least one of one or more operating conditions of the wind turbine or one or more wind conditions of the wind turbine;

determining, via the turbine controller, a difference between the actual rotor loading and the estimated rotor loading;

determining, via the turbine controller, whether a defective blade condition is present in the rotor blade based on the difference; and, if the defective blade condition is present, implementing a corrective action based on a type of the defective blade condition, wherein implementing the corrective action further comprises generating a vector of measured actual rotor loadings of the rotor blade and determining whether the defective blade condition is positioned towards feather or power based on the vector.

10. The method of claim 9, wherein the type of the defective blade condition comprises at least one of a blade run-away condition or a blade stuck condition.

11. The method of claim 9, wherein determining whether the defective blade condition is present in the rotor blade based on the difference further comprises determining whether the estimated rotor loading is less than the actual rotor loading by a predetermined amount.

12. The method of claim 9, wherein the one or more operating conditions comprises at least one of one or more pitch angles of the rotor blades, rotor speed, generator speed, torque output, or power output, and wherein the one or more wind conditions comprises at least one of wind speed, wind direction, turbulence, wind gust, or wind shear.

* * * * *